Sept. 1, 1964   J. S. SWEARINGEN   3,146,602
PROCESS AND APPARATUS FOR ELIMINATING FIXED GAS FROM
AN ABSORPTION REFRIGERATION SYSTEM
Filed Dec. 5, 1961   2 Sheets-Sheet 1
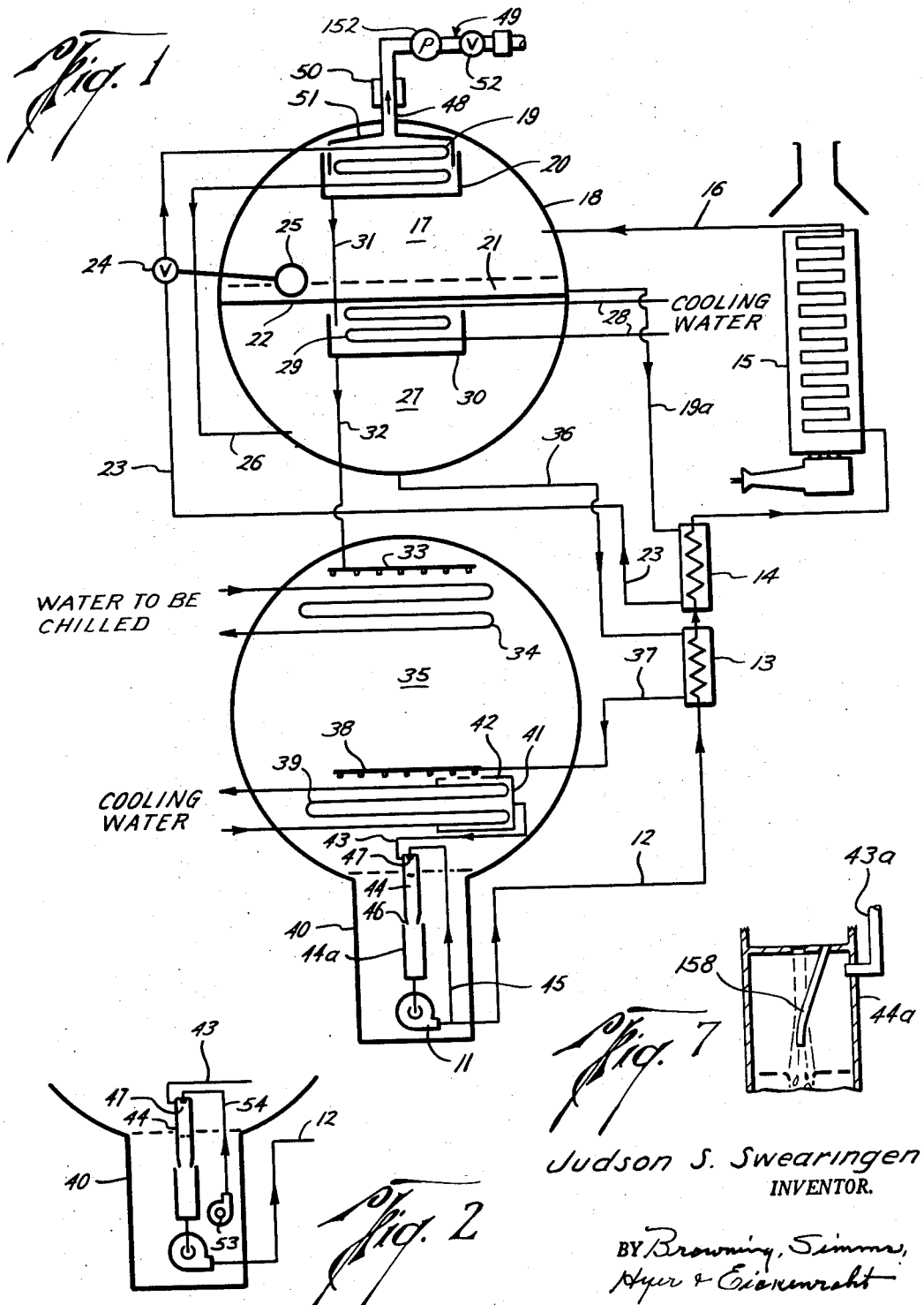
Judson S. Swearingen
INVENTOR.
BY Browning, Simms,
Hyer & Eickenroht
ATTORNEYS

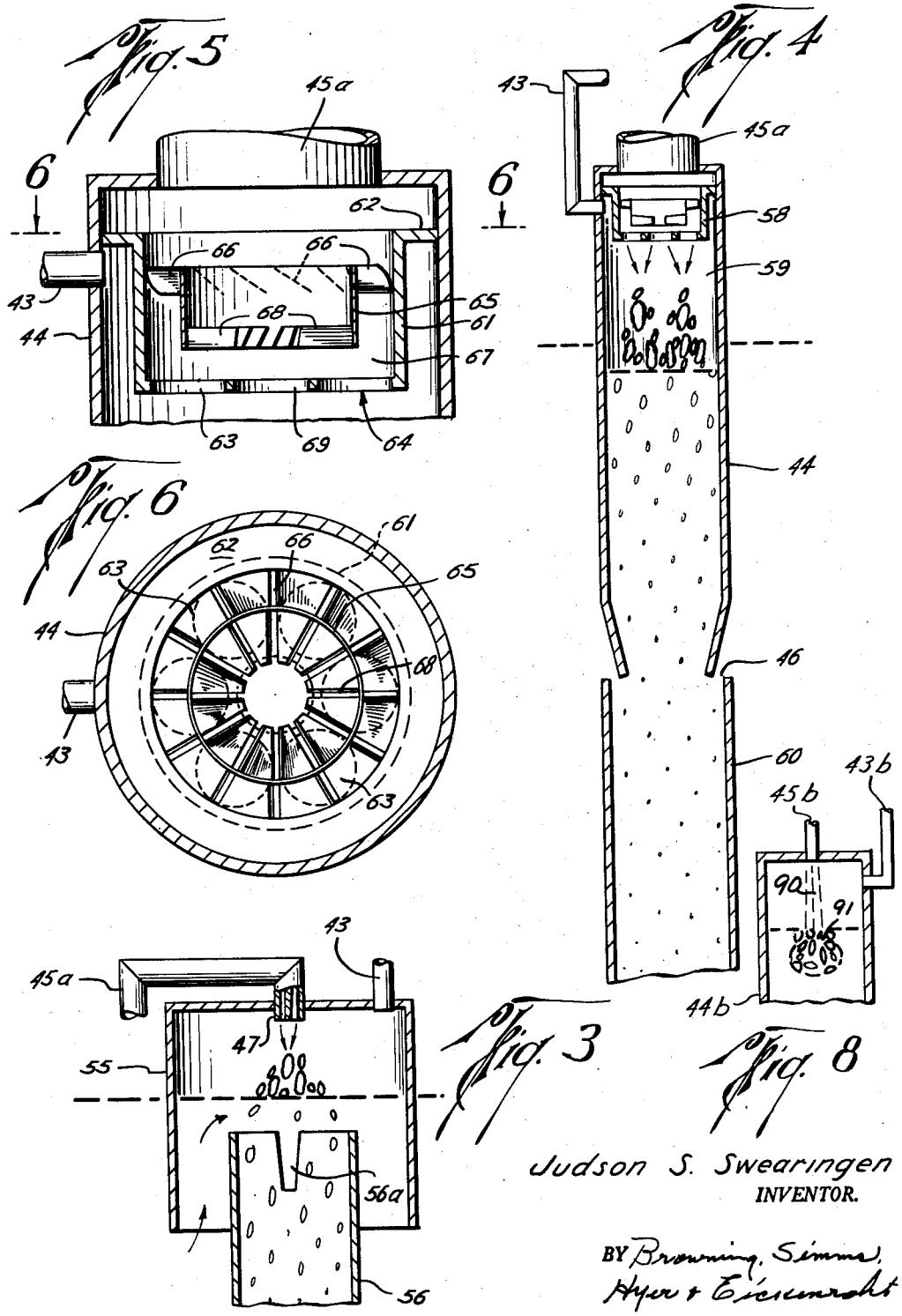

United States Patent Office 3,146,602
Patented Sept. 1, 1964

3,146,602
PROCESS AND APPARATUS FOR ELIMINATING FIXED GAS FROM AN ABSORPTION REFRIGERATION SYSTEM
Judson S. Swearingen, Los Angeles, Calif., assignor, by mesne assignments, to Electronic Specialty Co., Los Angeles, Calif., a corporation of California
Filed Dec. 5, 1961, Ser. No. 157,170
13 Claims. (Cl. 62—85)

This invention relates to improved processes and apparatus for eliminating fixed gas from absorption refrigeration systems in which absorption of refrigerant vapor by a suitable absorbent occurs at a low pressure in one part of the system and absorbed refrigerant is vaporized from the absorbent under a higher pressure at another location therein. It is particularly useful in refrigeration systems having two-effect generators and utilizing lithium bromide-water as an absorbent-refrigerant pair but is not limited to such use.

Absorption refrigeration depends upon the evaporation of a volatile refrigerant under controlled pressure for its cooling effect. In order to maintain a pressure in an evaporator such that continuous evaporation of the volatile refrigerant occurs, the vapor produced is removed continuously by absorption in a liquid absorbent. Pressure in the evaporator is controlled by the temperature and concentration of the absorbent. The absorbent must have sufficiently high affinity for the refrigerant vapors that the low pressure required to cause evaporation of refrigerant is maintained.

Absorption refrigeration cycles involve four basic steps:

(a) The application of heat to a solution of refrigerant in a liquid absorbent to boil refrigerant vapor out of the solution;

(b) The condensation of refrigerant vapors to liquid refrigerant in another part of the system;

(c) The evaporation of liquid refrigerant under reduced pressure in an evaporator section where the useful cooling is accomplished; and (d) The absorption of vapors of refrigerant in the liquid absorbent.

The process is cyclic. Spent, or partially spent, absorbent-refrigerant solution is withdrawn from an absorber in which step (d) above is conducted and is passed to a generator where the solution is heated and refrigerant vapor is evaporated therefrom. Regenerated absorbent from which the refrigerant has been evaporated is recycled to an absorber usually through a heat exchanger wherein at least a part of the heat contained in the hot regenerated absorbent is passed to incoming spent absorbent. Both absorption and evaporation steps usually are operated at very low pressures, usually not more than 0.1 atmosphere and frequently of the order of 0.01 atmosphere. The generator from which the refrigerant vapors are boiled off and a condenser following the generator in the cycle arranged to condense refrigerant vapors for return to the evaporation step may be operated at pressures constantly or periodically in excess of the pressure in the evaporation and absorption steps.

Frequently step (a) above is conducted in two stages using first and second effect generators. When the two-effect generator system is used, it is customary to pass liquid and gas from the first-effect generator into a separator where the refrigerant vapors are separated from the absorbent solution. Both vapor and liquid from the separator are then conducted to a second-effect generator where the liquid flows through a conduit under reduced pressure in indirect heat exchange relationship with the vapor from the separator. Pressure on the liquid is sufficiently low in the second-effect generator so that the vapor coming from the separator is hot enough to cause a second boiling off of refrigerant with resulting condensation of vapor from the separator. The vapor boiled off in the second-effect generator is then condensed, and the condensate is combined with condensate from vapor coming from the separator and the cycle proceeds as described above.

All parts of a system of this type in which the pressure is subatmospheric must be enclosed and hermetically sealed. It is necessary for practical reasons to use inexpensive materials of construction such as steel; and steel reacts slightly with absorbent solution, such as lithium bromide, to produce small quantities of hydrogen. The corrosion usually is not serious from the standpoint of durability of the apparatus; but hydrogen, being a fixed gas, interferes with proper performance of condensing surfaces and with absorption of refrigerant vapor in the absorbent by reducing the mol fraction of refrigerant vapor in the gas in contact with absorbent. As pressure decreases, difficulties due to the presence of small quantities of fixed gas are greatly increased.

Several suggestions have been made for the removal of fixed gas from sections of the system which are operated under subatmospheric pressure. For absorption refrigeration systems using the lithium bromide-water combination and having a single-effect generator and operated with all parts of the system at a pressure of the order of 0.01 atmosphere, fixed gas has been removed periodically by pumping it out with a vacuum pump or by allowing it to diffuse into the atmosphere through a semipermeable membrane made of palladium.

Palladium membranes, however, are quite expensive and fixed gas in the system is not necessarily all hydrogen but may be residual air introduced into the system by leakage, or in solution in absorbent or refrigerant.

In a system employing the four steps described above in which evaporation of refrigerant and absorption thereof in a suitable absorbent occurs at very low pressure while the generation step, in one or two stages, and initial condensation of refrigerant to liquid state occurs at higher pressure, vacuum pumps of the required degree of efficiency also are quite expensive and add considerably to the initial cost of a system of this type. The power requirements of such vacuum pumps add substantially to the cost of operation.

It is a principal object of this invention to provide a process and apparatus for eliminating fixed gas from an absorption-refrigeration system in which a part of the system normally operates under lower pressure while another part of the system is at higher pressure.

Another object is to provide a process and apparatus of the foregoing type in which vacuum pumps and semipermeable membranes are eliminated.

Another object is to provide an improved process and apparatus for transferring fixed gas from an absorption section of an absorption-refrigeration system where the gas is under subatmospheric pressure to a section of the system wherein gases and vapors are under a higher pressure, for example, superatmospheric pressure, and ejecting the fixed gas from the latter section.

Another object is to provide an improved process and apparatus for such transfer of gas in which the gas does not interfere with efficient operation of a pump.

Another object is to provide an improved process and apparatus capable of transferring large quantities of fixed gas at minimum expenditure of power.

Still another object is to provide an improved process and apparatus for removing fixed gas from the system in which neither the liquid absorbent nor the refrigerant is exposed to contamination from the atmosphere.

Another object is to provide such process and apparatus wherein fixed gas may be continuously removed from an absorber section of the system wherein loss of liquid absorbent or refrigerant with the fixed gas is reduced or eliminated.

Other objects, advantages and features of this invention will be apparent to one skilled in the art upon a consideration of the written specification, the claims and the attached drawings.

In the process of the present invention fixed gas is concentrated in a zone in an absorber section during an absorbing step. The resulting concentrated fixed gas is then dispersed in liquid absorbent and is pumped to a gas separation zone. The dispersion preferably is accomplished by introducing the concentrated fixed gas containing large proportions of residual refrigerant vapor into a fluid attrition zone which is maintained under a pressure approximately that of the absorbing step and low enough that gas present in the fluid attrition zone does not have sufficient inertia to break up a jet of entering liquid absorbent into a spray.

A stream of partially spent absorbent also is introduced into the fluid attrition zone at high velocity and preferably is mechanically disintegrated into discontinuous streams of discrete masses of liquid as it passes through the fluid attrition zone. The multiple discontinuous streams of discrete masses of liquid are impinged on the surface of a moving column of liquid absorbent being withdrawn from the attrition zone so as to form changing zones of turbulence across the surface of the liquid. The liquid forms pockets in which gas is trapped in the form of bubbles.

The bubbles are submerged by rapid addition of partially spent absorbent to the surface of the moving column of absorbent, and an effluent is withdrawn downward from the fluid attrition chamber at a rate sufficient to sweep the bubbles along with the flowing liquid. As the bubbles pass downward with the effluent, they are hydraulically compressed by head of liquid accumulating behind them; and since this liquid is only partially spent absorbent, residual refrigerant vapors are absorbed into the absorbent. As a result, no unpumpable foam is formed, but the effluent is essentially a liquid containing scattered bubbles of gas which do not interfere with the pumpability of the liquid.

Alternatively, suspension of bubbles of the gas in the liquid in the bottom of the attrition zone may be accomplished by passing a high velocity jet of partially spent absorbent through the attenuated gas in the fluid attrition zone without mechanical disintegration of the jet. The jet passes through the attenuated gas substantially in the form of a cylinder or rod and impinges upon the surface of the liquid in the bottom of the attrition zone with sufficient force to cause a small zone of extremely high turbulence in the surface of the liquid surrounding the entering jet. Apparently because there is some residual turbulence in a jet of this type, the jet does not impinge constantly upon one particular location on the liquid surface but tends to move slightly, back and forth in an erratic manner. As a result, liquid masses are broken off from either the jet or the surface of the liquid, or both, and enfold and submerge bubbles of the attenuated gas in the same manner that these are submerged by streams of discrete masses of liquid. Normally the unbroken jet is less effective in trapping bubbles than is a jet broken into discontinuous streams of discrete masses of liquid; but where small quantities of fixed gas are present, an unbroken jet of this type impinging upon the surface of liquid will be found effective.

The effluent is withdrawn to the intake of a pump and is pumped at higher pressure in a recycle course which includes a zone where the gas is at least partially separated from the liquid. This zone may either precede or follow the regeneration step where the spent absorbent is heated to drive off refrigeration vapors therefrom, but the latter is preferred.

Fixed gas in the absorber section preferably is concentrated in a hood arranged to enclose a part of the absorbing surfaces by flow of refrigerant vapor into the hood. This effect is accomplished by introducing a part of the absorbent upon the enclosed surfaces, thus directing flow of a large volume of refrigerant vapor into the hood, sweeping fixed gas along with it. Absorption of refrigerant vapors in the hood then leaves fixed gas in concentrated state.

The resulting concentrated fixed gas containing large quantities of residual refrigerant vapor is introduced into the fluid attrition chamber where it is subjected to the action of a stream of effluent leaving the absorption section as described above. A comparatively small volume of liquid passing at high velocity through the fluid attrition zone in discontinuous streams of discrete masses of liquid striking upon the surface of liquid in the lower part of the fluid attrition chamber is effective to submerge large volumes of bubbles. When, as usually is the case, the gas is largely residual refrigerant vapor, the effluent from the fluid attrition zone will act as an efficient absorber removing refrigerant vapor from the fixed gas. Thus, large initial volumes of gas can be handled, and hydraulic compression of bubbles of residual fixed gas assists in preventing the formation of unpumpable foams.

Liquid and entrained bubbles of fixed gas may be pumped to a generator section of the system where the pressure is higher than that in the absorber. The liquid effluent is heated in the generator to a temperature above boiling, and the fixed gas is driven off with vapors of refrigerant. The refrigerant vapor and liquid issuing from the generator preferably are introduced to a second-effect generator where additional boiling off of refrigerant vapor occurs. All gas and vapor not condensed in this step are conducted to a condenser where substantially all the refrigerant vapor is condensed. The condenser also is under such higher pressure.

When pressure in the condenser is superatmospheric, residual fixed gas may be ejected therefrom without substantial loss of refrigerant vapor by use of suitable ejection means, preferably including an ejection line containing a temperature responsive valve and a check valve in series, in which the check valve is arranged to be opened by superatmospheric pressure within the condenser section, and the temperature responsive valve closes when temperature of ejected gas approaches that of refrigerant vapor. However, if pressure in the condenser is to be less than atmospheric, as for example 10 p.s.i.a., a vacuum pump having its intake connected with the interior of the condenser may be connected in series with the valves described above.

Thus, fixed gas entrained in an effluent from the absorber section is first substantially freed from residual refrigerant vapor by absorption in partially spent absorbent at increased pressure. The increased pressure further decreases the size of individual bubbles of the fixed gas to such extent that these bubbles do not cause cavitation or improper operation of a pump, and the fixed gas is transferred along with effluent to a generator by the pump. Refrigerant vapor containing fixed gas is passed on through the system to a condenser where the fixed gas is separated from refrigerant vapor by condensation of the latter. The fixed gas then is ejected from the system.

Any desired mechanical means for disintegrating the stream of liquid into discontinuous streams of discrete masses may be used in the fluid attrition zone, such as members having fixed or moving surfaces in position to be impinged upon by a jet of partially spent absorbent, or a suitable nozzle arranged to cause a plurality of jets to impinge upon each other, and thus to break the jet streams into discrete masses of liquid. This means is desirable because the concentrated fixed gas in the fluid attrition chamber is at a pressure so low that inertia of the gas is not sufficient to break up a jet stream into a spray, and without the disintegrating means a jet of liquid would pass through the gas in substantially cylindrical shape.

At pressures of 0.25 atmosphere formation of spray from a jet of liquid injected into a gas at high velocity is greatly reduced, because the attenuated gas does not have sufficient inertia to be efficient in breaking up the jet into a spray. At pressures of 0.1 atmosphere, spray formation is almost eliminated. At pressures of the order of 0.01 atmosphere, quite commonly used in evaporation and adsorption steps in adsorption-refrigeration systems, spray formation is substantially non-existent and a jet of adsorbent will pass through the gas in the form of a cylinder or rod. Impact of such cylinder or rod of liquid upon the surface of liquid contained in the bottom of the fluid attrition chamber is not as effective to submerge and suspend gas in the liquid as is the same quantity of liquid introduced as a jet and broken up into discontinuous streams of discrete masses of liquid. The above relationships of pressure and jet distintegration are merely illustrative, and results tend to vary somewhat according to the particular gas and liquid used. In any case, as gas pressure falls a point will be reached where inertia of the gas is ineffective to distintegrate a jet of liquid. In absorption-refrigeration systems, pressures in absorber sections are below this point.

In the attached drawings, wherein like reference characters are used throughout to designate like parts:

FIG. 1 illustrates schematically a novel arrangement of apparatus in which a process of this invention may be carried out;

FIG. 2 shows a modification of the apparatus of FIG. 1 in which two separate pumps are used;

FIG. 3 is an enlarged detailed view of a fluid attrition chamber patricularly useful in submerging bubbles of fixed gas and residual refrigerant vapor in an effluent from an absorption chamber;

FIG. 4 illustrates diagrammatically one particular type of outlet tube and fluid attrition chamber particularly desirable for use when a liquid level fluctuates widely;

FIG. 5 is a vertical section through one preferred type of multiple jet nozzle which I have found to be exceptionally efficient in submerging gas in an effluent from an absorber section;

FIG. 6 is a section through the nozzle of FIG. 5 taken on the line 6—6;

FIG. 7 is a section through a modified fluid attrition chamber showing a rod in position to distintegrate a stream of liquids; and FIG. 8 is a section through a modified fluid attrition chamber showing turbulence of a liquid surface therein induced by a high velocity jet.

In the following detailed description, the process and apparatus will be described in application to a lithium bromide-water absorbent-refrigerant pair, but it is to be understood that the process and apparatus described may be applied to other refrigerant-absorbent pairs.

In FIG. 1 a lithium bromide solution which has absorbed water in an absorption step is pumped by pump 11 through line 12 to a pair of heat exchangers 13 and 14 where it passes in indirect heat exchange relationship with other effluents from other parts of the apparatus to be described later and on into heater 15. In heater 15 the solution is heated to a temperature above its boiling temperature and is passed through line 16 into a flash chamber 17 in the upper part of a drum 18. The heater 15 thus is a first-effect generator for boiling off refrigerant vapors, in this case water vapor, from the absorbent containing an excess proportion of the same. Flash chamber 17 serves as a separator in which water vapor is separated from concentrated lithium bromide solution. Pressure in the flash chamber 17 may be above atmospheric pressure if desired but may be maintained at subatmospheric pressure greater than pressure in evaporator-absorber section 35.

The vaporized refrigerant in the upper part of flash chamber 17 condenses on the surface of a coil 19 and drops downward into a tray 20. Unvaporized concentrated lithium bromide solution falls onto a plate 22 dividing drum 18 into upper and lower sections and accumulates thereon in a liquid layer 21.

Solution from layer 21 flows through line 19a, heat exchanger 14 and line 23 to coil 19. A valve 24 in line 23 responsive to a float 25 floating on the liquid layer 21 in separation chamber 17 controls flow through line 23 and permits reduction of pressure on liquid in that part of line 23 downstream of the valve and in coil 19. The solution flowing through coil 19 is under substantially lower pressure so that it may boil at a temperature lower than that of water vapor in separation chamber 17, and a mixture of liquid and vapor is discharged through line 26 into chamber 27 below the dividing plate 22.

For example, pressure in chamber 27 may be maintained at several pounds per square inch less than pressure in chamber 17; that is, if pressure in chamber 17 is in the range from 1 to 3 p.s.i.g., pressure in chamber 27 would normally be maintained at about 1 to 1.5 p.s.i.a. Pressure differential between these chambers is maintained by introducing cooling water through line 28 and coil 29 at a rate great enough to condense water vapor in chamber 27 rapidly. Water condensing on coil 29 drops downward into tray 30 where it is mixed with water from tray 20 flowing under the pressure differential between chambers 17 and 27 through line 31.

The total water accumulating in tray 30 is withdrawn through a suitable means for withdrawal and is distributed by suitable means for distributing liquid illustrated as a sprinkler 33, over a coil 34 in a chamber 35. Thus, in the above example, chamber 35 is operated at pressure substantially lower than the pressures existing in chamber 17. A stream of fluid to be chilled, such as water, is circulated through coil 34. The low pressure in chamber 35 causes the water introduced by sprinkler 33 and spread upon the surface of coil 34 to evaporate, and in evaporating this water takes up its heat of evaporation from the stream to be chilled flowing through coil 34. Water vapor is evolved at a very rapid rate but is disposed of and the pressure is maintained at a low level by a process now to be explained.

The concentrated unvaporized lithium bromide solution introduced by line 26 into chamber 27 falls to the bottom of the chamber and is withdrawn by line 36 to heat exchanger 13 where it is cooled by indirect heat exchange with spent absorbent returned to the heater 15 by line 12. The cooled concentrated lithium bromide solution is introduced into chamber 35 by line 37 discharging into a suitable distribution means illustrated as a sprinkler 38 disposed to distribute the concentrated absorbent solution over coil 39 through which cooling water from a source (not shown) is circulated. The avidity of the concentrated cooled lithium bromide solution for water vapor is so great that it absorbs the water vapor evolved on coil 34 and maintains the required low pressure in chamber 35.

It will be seen that there is a flow of large volumes of water vapor from coil 34 to the absorbent on coil 39. This flow of vapor is so great that it will sweep with it any fixed gas present in chamber 35 with the result that the fixed gas present will become concentrated around coil 39.

The concentrated lithium bromide absorbent becomes partially spent by absorbing refrigerant (water) vapor and thus becoming more dilute. It then falls from coil 39 and accumulates in a sump 40 at the bottom of chamber 35. Pump 11 continually withdraws liquid from sump 40 and returns the partially spent absorbent through line 12 to the regenerating system previously described, and the cycle is repeated.

A means for concentrating fixed gas in a zone in the absorption chamber illustrated as hood 41 is arranged to close three sides of a zone 42 around one end of coil 39.

The hood functions to concentrate fixed gas in this zone by flow of refrigerant vapor along the coil into the hood induced by fresh absorbent introduced from sprinkler 38 onto the absorbing surfaces of the coil within the hood, preferably through openings in the hood between the sprinkler and coil. A strong flow of refrigerant vapor into the hood results from this arrangement, and this flow is great enough to sweep fixed gas with it into the hood where the fixed gas is concentrated by absorption of refrigerant vapor. A fixed gas suction tube 43 is disposed to withdraw fixed gas mingled with residual water vapor from zone 42. Withdrawal at this point increases the rate of flow of the fixed gas and residual water vapor into the hood and thus aids in removing fixed gas from the working surface of coil 39.

Fixed gas withdrawn by line 43 is submerged in the effluent of spent absorbent leaving sump 40. A major part of the effluent enters line 44a through an annular opening 46 around the lower end of purge tube 44, but a portion of the effluent is recycled to multiple jet nozzle 47 via line 45 branching off line 12 downstream of pump 11; and the recycled portion of the effluent is broken up into streams of discrete liquid masses which pass at high velocity through gas in the upper end of purge tube 44 which defines a fluid attrition chamber and into liquid in tube 44. The liquid passes at high velocity and turbulence through gas in the upper end of purge tube 44, traps bubbles of gas at the surface of liquid in tube 44, and inundates and submerges the bubbles in the liquid flowing downward through purge tube 44.

The entrained bubbles contain a mixture of fixed gas and residual water vapor withdrawn from space 42 within hood 41. Liquid in tube 44 is withdrawn to pump 11.

Additional liquid is admitted at annular openings 46 to maintain maximum inlet pressure in pump 11.

Fixed gas is discharged from heater 15 through line 16 into separator chamber 17 and rises with water vapor to an upper part of this chamber. A hood 51 is arranged above coil 19 to collect fixed gas passing upward over the coil. Gas collected by hood 51 and containing some residual water vapor passes up through a line 48 to an automatic air vent valve designated generally as 49. Line 48 has a section which is cooled, preferably by air cooling fins 50 attached thereto, and arranged so that most of the water vapor accompanying the fixed gas will be condensed in this section and will flow down the walls of line 48 and drop into tray 20. Thus, only fixed gas having negligible water content will reach the valve 49.

The valve arrangement 49 may be merely a common automatic steam system air vent valve such as is conventionally used for venting air from steam radiators or may be of any desired type for ejecting fixed gas with little loss of water vapor. When pressure in flash chamber 17 is maintained under subatmospheric pressure, a vacuum pump 152 is required; but when pressure in chamber 17 is superatmospheric, this pump is unnecessary and may be eliminated.

It is therefore apparent in the device illustrated that entrainment of gas in the effluent from chamber 35 and transfer to chamber 17 enables its withdrawal from the absorption chamber where it is under extremely low pressure and ejection to the atmosphere from a point in the system which is above atmospheric pressure.

FIG. 2 illustrates another embodiment of the invention in which partially spent absorbent is supplied from a separate pump. The arrangement is substantially the same as that shown in FIG. 1 except for the source of absorbent recycled to the fluid attrition chamber in purge tube 44. In FIG. 2, liquid in sump 40 enters the inlet 53 of the pump and is pumped through line 54 to jet 47. This arrangement has the advantage that all liquid flowing in line 54 and through multiple jet 47 is free from fixed gas and thus somewhat more effective in submerging gas drawn into purge tube 44 via line 43. When a relatively large amount of fixed gas is to be withdrawn from chamber 35, and recycle of a large part of the effluent is required, the arrangement of FIG. 2 is to be preferred. Absorbent from sources other than the sump also may be employed, if desired.

In FIG. 3, a simple arrangement is shown wherein discrete masses of recycled spent absorbent are directed into the total effluent from sump 40 at the entrance to a suction line to pump 11. In this arrangement a hood 55 having an open bottom is disposed around the upper end of the pump intake line 56. Level of liquid in the sump is maintained sufficiently high to cause liquid from sump 40 of FIG. 1 to overflow into the top of the intake line 56 following a course indicated by the arrows but not high enough to cause the hood to be substantially filled with liquid. Suction line 43 carrying fixed gas from space 42 within hood 41 is connected to discharge this gas into the upper part of the hood so that the jetting device 47 directs multiple jets of recycled effluent through the gas. Bubbles are entrained in the jet stream at the surface of liquid in hood 55 and carried downward to the pump as described under FIG. 1, above. This arrangement works well so long as liquid level within the hood does not fluctuate widely. The size of the hood is chosen so that there is no noticeable resistance to flow through the bottom of the hood, up and over the top of line 56. This modification obviously could not function at all if the level in hood 55 should fall below that of the top of line 56, but considerable variations in liquid level within hood 55 can be tolerated when slots as shown at 56a are cut in tube 56 at its upper end.

In some systems the liquid level in sump 40 will fluctuate rather widely. When this condition is present, I prefer to use the arrangement shown in FIG. 4. In this arrangement, the upper part of purge tube 44, including fluid attrition chamber 59, is of considerable length and at the top is connected with line 45a carrying recycled effluent upward from a pump. The length of the purge tube 44 is chosen so that there will be considerable length between the annular opening 46 and a multiple jet nozzle 58 since this arrangement is not efficient when the liquid level falls to the level of the opening 46. The length of purge tube 44 can be so chosen that good operation is obtained with rather wide fluctuations in liquid level.

The multiple jet nozzle 58 is of such size that it extends entirely across the upper end of purge tube 44 and thus provides a gas chamber 59 into which fixed gas withdrawn from chamber 35 is introduced by line 43. Recycled effluent entering through line 45a is broken up into discontinuous streams of discrete masses of liquid by passing through nozzle 58 and submerges large quantities of gas from chamber 59 which is carried downward by the effluent in purge tube 44 in the form of bubbles, and withdrawn rapidly from the absorber section at a rate sufficient to prevent them from working their way upward through the liquid into the gas chamber 59. This velocity is easily maintained by selecting the proper size of the annular opening 46 and the proper capacity and speed of pump 11 shown in FIG. 1. The jet nozzle 58 preferably is arranged to deliver a plurality of turbulent jet streams so directed that their turbulence will cause them to impinge on each other but will not result in excessive contact with the walls of chamber 59.

Ejected in this manner the jet streams inundate large quantities of gas at the surface of liquid in chamber 59 and submerge bubbles of gas into the liquid flowing downward through purge tube 44 substantially without regard to the level of liquid in tube 44. Pressure in line 45a is higher than in purge tube 44, but there is much less total flow through line 45a than through inlet tube 60 because of the resistance imposed by jet nozzle 58 and entrance of liquid through opening 46 makes up the difference in flow.

FIG. 6 illustrates a preferred nozzle of the type shown schematically at 58 in FIG. 4. The nozzle comprises a cylindrical portion 61 having at its upper end an outturned flange 62 in contact with the inner walls of purge tube 44. The jet nozzle has a flat bottom designated generally as 64 having a plurality of jet orifices 63 therethrough. The nozzle also contains an inner concentrical cylindrical part 65 attached to the outer cylinder 61 by a plurality of vanes 66 which hold the inner part 65 in spaced relationship from the bottom 64 and side walls of cylinder 61. The vanes 66 are arranged at an angle which causes liquid coming into the jet nozzle to swirl in a direction which may be clockwise or counterclockwise as desired. The swirling liquid then flows from the vanes 66 into a space 67 around and below the central cylinder 65 to the orifices 63.

Liquid entering the central cylindrical part 65 flows downwardly across vanes 68 arranged to cause liquid passing them to swirl in a direction opposite to the motion imparted by vanes 66. Preferably the cylinder 65 has about half the cross sectional area of the larger cylinder 61, and vanes 66 and 68 are arranged to substantially bisect each of orifices 63 arranged in a circle around central orifice 69.

As a result of the arrangement, optimum turbulence is attained in liquid jetted through the orifices 63 and 69. The high turbulence and random discontinuous nature of the jet streams results in discrete masses of falling liquid which trap large volumes of gas from chamber 59 at the surface of liquid therein, and the high velocity of the jet streams inundates and submerges bubbles into liquid flowing downward in purge tube 44.

The whirling and turbulent condition of the jet streams leaving each of the orifices results in a discontinuous liquid stream which will not travel as a cylindrical or conical column of liquid, but the streams of liquid leaving the orifices of the jet strike upon each other and break themselves up into a random stream of discontinuous liquid bodies. The streams impinge upon each other in falling and in their turbulent condition strike upon a great area of the liquid and do so in a random way so that there are discontinuities, and quantities of bubbles will be entrapped and submerged in the liquid.

The coalescence of streams of liquid into a continuous liquid stream by mixing with liquid streams entering through 46 and rapid movement of the resulting stream through 69 forms a pumpable stream rather than a froth or a coarse mixture of gaseous bubbles and liquid which would be unpumpable. It permits efficient operation of the pump 11 to pump such mixtures through the heat exchangers 13 and 14 and the heater 15, in which vaporization of the vapors and liberation of the gases result, which mixture of vapors, gases and unvaporized liquid is introduced into separating chamber 17.

Jets of liquid through gas at atmospheric pressure break up into spray and develop discontinuous character by impact with the air; but at the low pressure existing in fluid attrition chamber 59, this breaking up into a spray by impact with gas does not occur and few bubbles can be entrained by a continuous jet. Thus, the swirling and random turbulence of the jets and discontinuities in the jet stream are extremely important in trapping bubbles and submerging them in the liquid in tube 44.

While seven orifices, one central and six arranged in a circle thereabout, are shown in FIG. 6, it will be obvious that this jet arrangement is not limited to any particular number of orifices but that these may be varied to conform to the particular desired dimensions of the nozzle. However, the swirling and turbulent conditions of the jet streams must be maintained if they are to become most efficient in trapping bubbles of gas and submerging bubbles into the liquid.

The modification shown in FIG. 7 illustrates an element having a surface arranged in the path of a jet of partially spent absorbent and effective to break up the jet into discrete liquid masses by impact of the jet in the surface. This element is shown as a rod 158 bent at an obtuse angle supported in the fluid attrition chamber by the top of tube 44a with the apex of the angle in position to intersect the incoming jet. This arrangement may be substituted for the multiple jet nozzle described above and is quite efficient.

FIG. 8 illustrates a modification in which an unbroken jet passes through attenuated gas in the fluid attrition chamber and impinges upon the surface of partially spent effluent in the bottom of the chamber. The fluid attrition chamber is located in an upper part of purge tube 44b and communicates with hood 41 through line 43b. A stream of partially spent effluent is recycled through line 45b and is introduced into a jet into the top of the attrition chamber. Because of the attenuated state of gas in the attrition chamber, the jet 90 passes through the chamber in substantially cylindrical or rod shape and impinges upon the surface of effluent in tube 44b to create a zone or pocket of extreme turbulence surrounding jet 90. Jet 90 does not always impinge upon exactly the same location of the liquid surface, but apparently due to some residual turbulence has a tendency to quiver or move back and forth erratically through a small distance, thus increasing the size of the zone of intense turbulence 91. Apparently, discrete masses of liquid are detached or folded over so that gas is entrapped in this zone and is submerged and is withdrawn as described above.

It will be obvious that the zone of intense turbulence surrounding the point at which the jet enters the surface of the liquid is not so large as that which results from breaking up the jet into discontinuous streams of discrete masses of liquid while passing through the gas in the fluid attrition chamber, and that lesser efficiency in submerging gas in the effluent from tube 44b can be expected when the quantity and velocity of liquid recycled through line 45b is the same as that used with a mechanical means for breaking up the jet. However, this lower efficiency can be at least partially overcome by increasing the velocity of jet 90. When very small amounts of fixed gas are to be handled, this modification works well.

The gaseous effluent withdrawn from space 42 in the absorption chamber will be largely fixed gas when the system is first started in operation. After operating equilibrium is reached, the gaseous stream will be principally water vapor; perhaps 90 to 98 percent of it will be residual water vapor for the specific embodiment illustrated.

From the foregoing it will be seen that this invention is one well adapted to attain all of the ends and objects hereinabove set forth, together with other advantages which are obvious and which are inherent to the apparatus and method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A system for transporting gas which comprises in combination a source of gas under pressure sufficiently low that inertia of the gas is insufficient to disintegrate a jet of liquid passing therethrough; a fluid attrition chamber communicating with said source of gas; means for introducing a jet of a liquid which is inert toward said gas downward through the fluid attrition chamber into a body of the liquid in a lower part of said chamber in a direction to impinge upon the surface of said liquid; and a pump disposed to withdraw resulting liquid containing dispersed bubbles of gas at low pressure downward from said body of liquid to the intake of the pump at a velocity sufficient to increase head of liquid on said bubbles and to pass the liquid and dispersed bubbles at higher pressure to a desired location.

2. A system for transporting gas which comprises in combination a source of gas under pressure sufficiently low that inertia of the gas is insufficient to disintegrate a jet of liquid passing therethrough; a fluid attrition chamber communicating with said source of gas; means for introducing a jet of a liquid which is inert toward said gas downward through the fluid attrition chamber into a body of the liquid in a lower part of said chamber; means for mechanically disintegrating the jet into discontinuous streams of discrete liquid masses impinging on the surface of said body of liquid; and a pump disposed to withdrawn resulting liquid containing dispersed bubbles of gas at low pressure downward from said body of liquid to the intake of the pump and to pass the liquid and dispersed bubbles at higher pressure to a desired location.

3. In an absorption refrigeration process wherein steps of evaporating a refrigerant from a liquid absorbent containing the same and condensing evolved refrigerant vapor to liquid are conducted at a relatively high evaporation and condensation pressure; steps of evaporating the resulting liquid refrigerant and absorbing refrigerant vapor in the liquid absorbent are conducted at a pressure lower than said condensation pressure; partially spent liquid absorbent containing absorbed refrigerant is recycled from the absorbing step to the regenerating step; refrigerant vapor in the absorbing step becomes contaminated with fixed gas; fixed gas is concentrated during the absorbing step; a jet of partially spent liquid absorbent is passed through the concentrated fixed gas, thereby entraining fixed gas in the absorbent; the resulting mixture of gas and liquid absorbent is passed to a gas separation zone and is separated therein; and said lower pressure is maintained sufficiently low that inertia of the concentrated fixed gas does not effectively disintegrate the jet of liquid absorbent passed therethrough, that improvement which comprises maintaining a body of said partially spent liquid absorbent in contact with the concentrated fixed gas at said lower pressure; passing a jet of the partially spent liquid absorbent through the concentrated fixed gas into said body of liquid absorbent; mechanically disintegrating the jet into streams of discrete liquid masses in said gas; withdrawing an effluent containing submerged bubbles of concentrated fixed gas from said body of liquid partially spent absorbent; and separating fixed gas from the absorbent.

4. The process of claim 3 wherein the lower pressure is maintained below .25 atmosphere.

5. The process of claim 3 wherein the lower pressure is maintained below 0.1 atmosphere.

6. In an absorption refrigeration process where steps of evaporating a refrigerant from a liquid absorbent containing the same and condensing evolved refrigerant vapor to liquid are conducted at a relatively high evaporation and condensation pressure; steps of evaporating the resulting liquid refrigerant and absorbing refrigerant vapor in the liquid absorbent are conducted at a pressure lower than said condensation pressure; partially spent liquid absorbent containing absorbed refrigerant is recycled from the absorbing step to a regenerating step; refrigerant vapor in the absorbing step becomes contaminated with fixed gas; fixed gas is concentrated in the absorbing step; a jet of partially spent liquid absorbent is passed through the concentrated fixed gas, thereby entraining fixed gas in the absorbent; the resulting mixture of gas and liquid absorbent is passed to a gas separation zone and is separated therein; and said lower pressure is maintained sufficiently low that inertia of the concentrated fixed gas does not effectively disintegrate the jet of liquid absorbent passed therethrough, that improvement which comprises withdrawing concentrated fixed gas from the absorbing step; withdrawing partially spent liquid absorbent from the absorbing step; maintaining a body of withdrawn partially spent liquid absorbent in contact with withdrawn concentrated fixed gas at said lower pressure; passing a jet of withdrawn partially spent liquid absorbent through concentrated fixed gas into said body of liquid absorbent; disintegrating the jet into discrete masses in said withdrawn concentrated fixed gas; withdrawing an effluent of liquid partially spent absorbent containing bubbles of concentrated fixed gas from said body of liquid absorbent; and separating fixed gas from the absorbent.

7. The process of claim 6 wherein multiple jets of partially spent liquid absorbent are passed through withdrawn concentrated fixed gas into the body of liquid in directions to impinge upon each other in the gas.

8. In an absorption refrigeration process wherein steps of evaporating a refrigerant from a liquid absorbent containing the same and condensing evolved refrigerant vapor to liquid are conducted at a relatively high evaporation and condensation pressure; steps of evaporating the resulting liquid refrigerant and absorbing refrigerant vapor in the liquid absorbent are conducted at a pressure lower than said condensation pressure; an effluent of partially spent liquid absorbent containing absorbed refrigerant is recycled from the absorbing step to a regenerating step; refrigerant vapor in the absorbing step becomes contaminated with fixed gas; fixed gas is concentrated during the absorbing step; and said lower pressure is maintained sufficiently low that inertia of the concentrated fixed gas does not effectively disintegrate the jet of liquid absorbent passed therethrough, that improvement which comprises maintaining a body of said partially spent liquid absorbent in contact with concentrated fixed gas at said lower pressure; passing a jet of partially spent liquid absorbent through the concentrated fixed gas into said body of partially spent liquid absorbent; submerging bubbles of concentrated fixed gas in the body of liquid absorbent in a zone of high turbulence surrounding the jet; withdrawing an effluent of liquid partially spent absorbent containing bubbles of concentrated fixed gas from said body of liquid; and separating fixed gas from the absorbent.

9. In a closed absorption refrigeration system containing a refrigerant and a liquid absorbent having high affinity for the refrigerant and including, connected in cyclic sequence, means for heating liquid absorbent containing absorbed refrigerant to boiling temperature at higher pressure; means for condensing resulting refrigerant vapor to liquid at such higher pressure; means for evaporating condensed refrigerant at lower pressure; an absorption chamber containing means for contacting resulting refrigerant vapor intimately with liquid absorbent at such lower pressure; means for withdrawing an effluent of partially spent liquid absorbent containing absorbent refrigerant from said absorption chamber; and means for recycling the withdrawn effluent to said heating means, that improvement which comprises a hood in the absorption chamber partially enclosing said means for contacting refrigerant vapor intimately with liquid absorbent; a fluid attrition chamber; a line communicating with the interior of said hood with the interior of the attrition chamber; means, operatively connected to the absorption chamber and attrition chamber, for introducing a jet of partially spent liquid absorbent downward into the fluid attrition chamber into a body of such liquid absorbent in a lower part of the chamber; a separation chamber; and a pump disposed to withdraw an effluent downward from said lower part of the attrition chamber and to pass the withdrawn effluent at higher pressure in a recycle course through the system including the separation chamber.

10. The apparatus of claim 9 including means, in the attrition chamber, for mechanically disintegrating the jet of partially spent absorbent.

11. The system of claim 9 wherein the means for mechanically disintegrating the jet includes a multiple jet nozzle comprising an outer cylindrical part having a plurality of jet openings through the bottom thereof, an inner concentric hollow cylindrical part disposed therein, a plurality of vanes disposed in an annular space between the inner and outer cylindrical parts, said vanes being disposed at an angle to the axes of said cylindrical parts to deflect liquid flowing through said annular space in a swirling motion in one direction, and a plurality of vanes disposed in the inner cylindrical part at an angle to impart swirling motion to a liquid passing therethrough in a direction opposite to the swirling motion of liquid in said annular space.

12. The system of claim 9 wherein the fluid attrition chamber includes an upper part of a purge tube vertically disposed in a sump in a lower part of the absorption chamber and having at least one opening in a side thereof below the fluid attrition chamber adapted to admit an effluent from said sump.

13. The system of claim 9 wherein the fluid attrition chamber is a cylindrical hood disposed around an upper part of a purge tube, said purge tube being vertically disposed in a sump in a lower part of the absorption chamber and having at least one opening in a side thereof communicating with the sump below level of liquid in the sump.

References Cited in the file of this patent
UNITED STATES PATENTS

| | | |
|---|---|---|
| 2,202,010 | Kondolf | May 28, 1940 |
| 2,518,202 | Thomas | Aug. 8, 1950 |
| 2,522,410 | Thomas | Sept. 12, 1950 |
| 2,730,869 | Stubblefield | Jan. 17, 1956 |
| 2,940,273 | Leonard | June 14, 1960 |
| 2,940,274 | McGrath | June 14, 1960 |
| 2,959,935 | Leonard | Nov. 15, 1960 |
| 2,986,894 | Endress et al. | June 6, 1961 |
| 3,013,404 | Endress et al. | Dec. 19, 1961 |